2,725,393
TREATMENT OF ALKYL USTILATE ESTERS

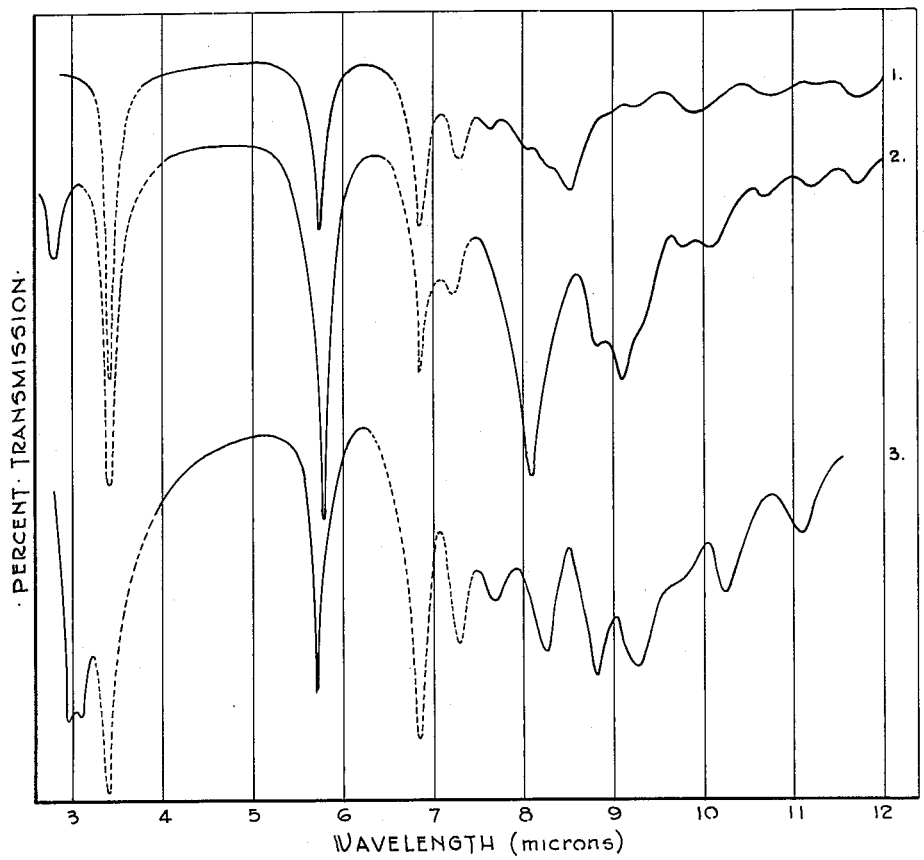
Infrared spectra of 30% dispersions in hydrocarbon oil
Curve 1- Methyl aldehydopentadecanoate.
Curve 2- Methyl 2-hydroxyaldehydopentadecanoate.
Curve 3- Methyl 2,15-dihydroxypentadecanoate.
--------- Hydrocarbon oil absorption bands.

Raymond U. Lemieux, Saskatoon, Saskatchewan, Canada, assignor to National Research Council, Ottawa, Ontario, Canada, a body corporate of Canada Application April 9, 1952, Serial No. 281,453

3 Claims. (Cl. 260—406)

This invention relates to the treatment of the alkyl esters of ustilic acids, 15,16-dihydroxyhexadecanoic and 2,15,16-trihydroxyhexadecanoic, for the production of useful compounds.

An object of the invention is to produce economically the known compound 15-hydroxypentadecanoic acid, which is particularly useful as an intermediate in the synthesis of the musk 15-pentadecanolactone, the new compound 2,15-dihydroxypentadecanoic acid, and the new compositions of matter, the alkyl esters of aldehydopentadecanoic and 2 - hydroxyaldehydopentadecanoic acids.

In accordance with the invention a mixture of the alkyl esters of 15,16-dihydroxyhexadecanoic acid (I) and 2,15,16-trihydroxyhexadecanoic acid (II) is dissolved in acetic acid and treated with a glycol-splitting oxidant to form alkyl esters of aldehydopentadecanoic acid (III) and 2-hydroxyaldehydopentadecanoic acid (IV). The esters may be treated individually or in admixture. The formulae of these compounds are as follows:

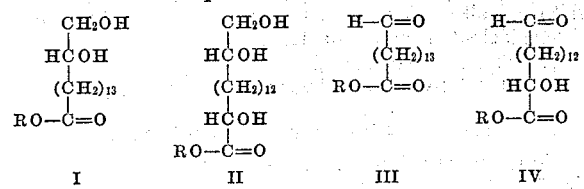

where R is a lower alkyl group containing not more than four carbons.

Hydrogenation of the aldehyde group of compounds III and IV yields alkyl esters of 15-hydroxypentadecanoic acid (V) and 2,15-dihydroxypentadecanoic acid (VI) which have respectively the following formulae:

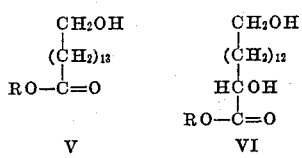

where R is a lower alkyl group.

Oxidizing agents used are lead tetraacetate, lead tetraoxide or sodium bismuthate (commercial preparation about 80% pure) and hydrogenation of the aldehydes is carried out in the presence of a hydrogen catalyst, such as Raney nickel. Oxidation is effected at 20 to 65° C. and hydrogenation at pressures of one atmosphere to 2000 p. s. i. and at temperatures from 100° C. to room temperature. Since the aldehydes readily undergo auto-oxidation, they should be protected from atmospheric oxygen both during their preparation and after isolation.

Specifically oxidation of the methyl ustilate, methyl 15,16-dihydroxyhexadecanoate, under the above described conditions yields methyl aldehydopentadecanoate. The latter substance is low-melting and has strong tendency toward auto-oxidation. An essentially pure preparation, M. P. 29–32° C., gave the infrared absorption spectrum of curve 1, Fig. 1 when mixed with hydrocarbon oil. Characteristic absorption bands are present at the following wavelengths expressed in microns: 11.80, 10.80, 9.93, 8.50, 8.05, 7.68 and 5.75. The substance is hydrogenated to the methyl ester of a known acid, 15-hydroxypentadecanoic acid, in nearly quantitative yield.

Oxidation of the methyl ustilate, methyl 2,15,16-trihydroxyhexadecanoate, under the above described conditions yields methyl 2-hydroxyaldehydopentadecanoate. The substance is characterized by the infrared spectrum shown as curve 2 of Fig. 1 found for a 30% mixture of a sample, M. P. 34–37° C., with hydrocarbon oil. The wavelengths of the characteristic absorption bands expressed in microns are: 11.76, 11.18, 10.70, 10.10, 9.85, 9.09, 8.86, 8.09, 5.78 and 2.78. The methyl 2-hydroxyaldehydopentadecanoate upon catalytic hydrogenation yields methyl 2,15-dihydroxypentadecanoate, M. P. 74.3–75.3° C. This substance is characterized by the infrared spectrum shown as curve 3 of Fig. 1 found for a 30% mixture with hydrocarbon oil. The wavelengths of the characteristic absorption bands expressed in microns are: 11.07, 10.22, 9.27, 8.79, 8.25, 7.68, 5.72, 3.08 and 2.94. Hydrolysis of this ester yields the new compound, 2,15-dihydroxypentadecanoic acid, M. P. 102–103° C.

The following examples illustrate the operation of the method:

1. Methyl ustilate of 15,16-dihydroxyhexadecanoic acid, M. P. 84–85° C., 4.19 gm. was dissolved in 80 ml. of acetic acid and 8 gm. of lead tetraacetate was added. The reaction mixture was shaken in a stream of cold water for fifteen minutes then left at room temperature for one hour. About ½ ml. of glycerol was added and the mixture was diluted with 80 ml. of "Skellysolve F" (petroleum ether solvent) and 40 ml. of ether and the resulting solution was poured into 200 ml. of cold water. After shaking, the water layer was withdrawn and washed once with 50 ml. of 30% ether in "Skellysolve F." The combined "Skellysolve F"-ether solutions were washed four times with 80 ml. amounts of water, filtered and evaporated to a colorless oil which soon crystallized. The material, essentially pure methyl aldehydopentadecanoate, was hydrogenated at 100 atmospheres for two hours at 100° C. over Raney nickel catalyst in 75 ml. of ethanol. The catalyst was removed by filtration and the ethanol solution was evaporated to a colorless oil which soon crystallized. The yield was 3.70 gm. or 98% theory of crude methyl 15-hydroxypentadecanoates. After one recrystallization from one part methanol and cooling to 0° C., the yield was 3.45 gm. of essentially pure material, M. P. 51–52° C. After two further recrystallizations the melting point was 51–51.5° C. Alkaline hydrolysis of this ester yielded 15-hydroxypentadecanoic acid, M. P. 84.5–85° C., the starting material for the synthesis of the musk known both as "Exaltolide" and "Thibettolide."

2. The crude methyl ustilate mixture, 5.00 gm. was oxidized with lead tetraacetate and the product was isolated as described above. The aldehydes were dissolved in 100 ml. of ethanol and the solution was hydrogenated at 100 atmospheres and room temperature for two hours in the presence of Raney nickel catalysts. The catalyst was removed by filtration and the filtrate was evaporated to a crystalline solid. This substance was dissolved in 20 ml. of chloroform and 100 ml. of "Skellysolve C" was added. After standing at 4° for one hour the solution deposited 1.15 gm. of a crystalline substance which was removed by filtration. Recrystallization of this material from two parts methanol yields the new compound methyl 2,15-dihydroxypentadecanoate, M. P. 74.3–75.3° C. Calc. for $C_{16}H_{32}O_4$: C, 66.64, H, 11.19%. Found: C, 66.80; H, 10.96%. The filtrate was evaporated in vacuo to an oil which soon crystallized. This substance was dissolved in 15 ml. of methanol and water was added to turbidity. On standing overnight at 4° C. the solution deposited 2.47 gm. of a crystalline substance, M. P. 46–48° C., which is crude methyl 15-hydroxypentadecanoate. The pure ester melts at 51–51.5° C. Hydrolysis of the crude ester gave 15-hydroxypentadecanoic acid which was essentially pure, M. P. 83–84° C., after one crystallization from ether.

3. Methyl ustilate, methyl 2,15,16-trihydroxyhexadecanoate, M. P. 74–75° C., 1.40 gm., was dissolved in 30 ml. of glacial acetic acid and 3.00 gm. of lead tetraacetate was added. The mixture was shaken until solution was complete and left at room temperature for one hour. Benzene, 50 ml., was added and the mixture was freed of acetic acid by successive extractions with 50 ml. volumes of water. A little glycerol was added to the first water extract in order to destroy the excess lead tetraacetate. The benzene solution was dried and evaporated in vacuo to an oil 1.25 gm., 98% yield, which soon crystallized. This product, M. P. 34–37° C., is crude methyl 2-hydroxyaldehydopentadecanoate. The material, 1.00 gm., was hydrogenated at 100 atmospheres for two hours at 100° C. over Raney nickel catalyst in 25 ml. of ethanol. The catalyst was removed by filtration and the ethanol was evaporated to a colorless oil which soon crystallized. After one recrystallization from two parts of methanol, the yield was 0.81 gm. of the above described methyl 2,15-dihydroxypentadecanoate, M. P. 74–75° C. Hydrolysis of this ester gave 2,15-dihydroxypentadecanoic acid, M. P. 102–103° C., after one recrystallization from methanol. The acid is very weakly levorotatory with specific rotation less than one degree in methanol.

4. The methyl ustilate mixture, 24 gm., was dissolved in 200 ml. of acetic acid and the solution was heated to 55–65° C. While at this temperature and with continuous stirring, 64 gm. of red lead, $Pb_3O_4$, was added in 4 gm. portions, each portion being added after the previous one had decolorized. The stirring was continued for fifteen minutes after the last addition. After this time, 200 ml. of ligroin was added, followed by 400 ml. of water. After shaking, the aqueous layer was removed and extracted with 100 ml. of ligroin. The combined ligroin extracts were washed free of acetic acid by repeated extractions with 100 ml. volumes of water. On removal of the ligroin by evaporation in vacuo, an oil, 20.1 gm., was obtained, which hardened at room temperature. This material was a mixture comprising methyl aldehydopentadecanoate and methyl 2-hydroxyaldehydopentadecanoate.

The mixture of esters was dissolved in 100 ml. of ethanol and hydrogenated at 1000 lbs. per sq. in. pressure and room temperature for five hours using Raney nickel catalyst. The catalyst was removed by filtration and the solution was evaporated in vacuo to yield 20.1 gm. of hydroxy esters. This material was dissolved in 80 ml. of chloroform and 400 ml. of ligroin was added. On standing overnight at 4° C., the solution deposited 5.2 gm. of a white crystalline material which was essentially pure methyl 2,15-dihydroxypentadecanoate. The filtrate was evaporated in vacuo to an oil which was dissolved in 50 ml. of ethanol and 3 gm. of sodium hydroxide in 20 ml. of water was added. After refluxing for one hour, the mixture was poured into 300 ml. of hot water which contained 9 ml. of concentrated hydrochloric acid. The oil which separated, crystallized on cooling and was collected by filtration. The yield was 14.1 gm. of crude 15-hydroxypentadecanoic acid which was purified by recrystallization from ether.

5. Crude methyl ustilate mixture, 10 gm., in 70 ml. of glacial acetic acid was oxidized by the addition of sodium bismuthate at such a rate as to keep the reaction temperature at 50°±4° C. A total of 16 gm. of oxidant was added over a period of two hours with continuous mechanical stirring. Ligroin, 50 ml., and water, 50 ml., were added and the mixture was shaken. The bottom aqueous layer which separated was extracted three times with 30 ml. amounts of ligroin and the combined ligroin extracts were washed free of acetic acid using 50 ml. amounts of water. After drying over sodium sulphate, the ligroin solution was evaporated in vacuo to an oil which consisted of a mixture comprising methyl aldehydopentadecanoate and methyl 2-hydroxyaldehydopentadecanoate as was obtained on the lead tetraacetate oxidation of the methyl ustilate mixture and which can be used for the preparation of 15-hydroxypentadecanoic acid as was described above in Example 2.

I claim:

1. As a new composition, a mixture consisting essentially of alkyl aldehydopentadecanoate and alkyl 2-hydroxyaldehydopentadecanoate.
2. Alkyl aldehydopentadecanoate.
3. Alkyl 2-hydroxyaldehydopentadecanoate.

References Cited in the file of this patent

Noller et al.: Journal of American Chem. Soc., 48, 1077 (1926).
Lycan et al.: ibid, 51, 625, 628 (1929).
Fieser et al.: "Org. Chem.," 1950, page 411.